C. R. PATTY.
COUPLING.
APPLICATION FILED APR. 24, 1913.
1,098,294.
Patented May 26, 1914.
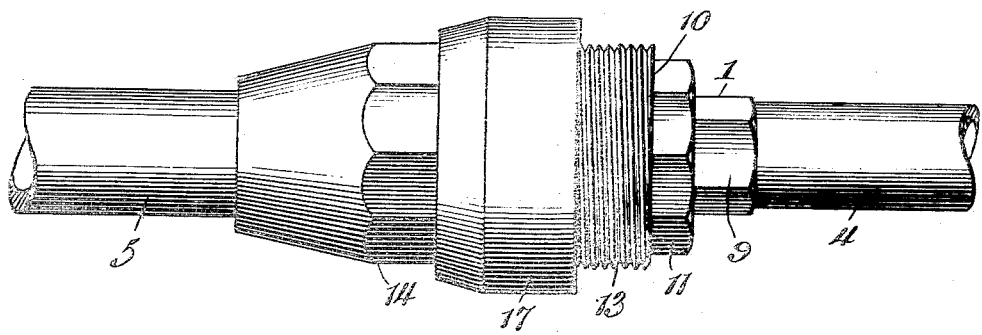
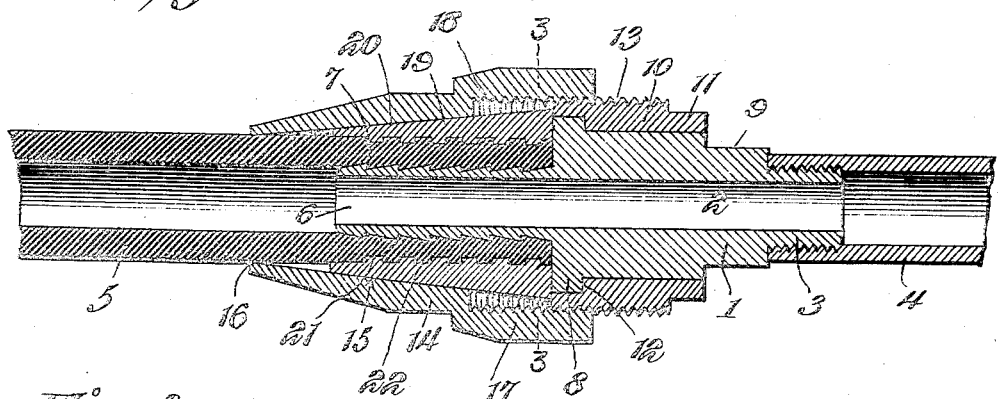
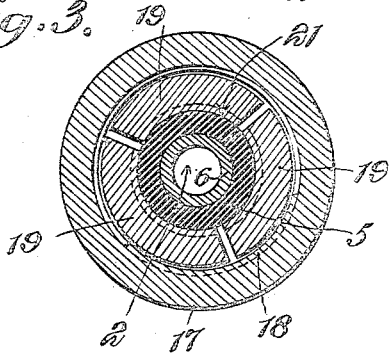
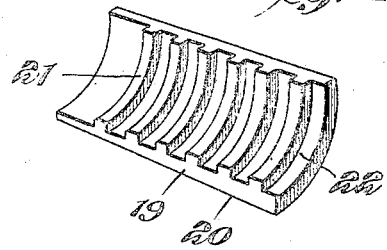
WITNESSES
Howard D. Orr,
F. T. Chapman.
C. R. Patty, INVENTOR,
BY
ATTORNEY

UNITED STATES PATENT OFFICE.

CLARENCE R. PATTY, OF MEMPHIS, TENNESSEE.

COUPLING.

1,098,294. Specification of Letters Patent. Patented May 26, 1914.

Application filed April 24, 1913. Serial No. 763,307.

*To all whom it may concern:*

Be it known that I, CLARENCE R. PATTY, a citizen of the United States, residing at Memphis, in the county of Shelby and State of Tennessee, have invented a new and useful Coupling, of which the following is a specification.

This invention has reference to improvements in couplings, and is designed to provide a positive clamp for holding hose onto a fitting or connection where there is pressure or conditions that would otherwise cause a separation of the hose from the part to which it is connected. When hose is new almost any simple clamp is sufficient to hold the hose, but when the hose has been in use for some time and the rubber becomes soft on the inside the ordinary hose connections fail.

In accordance with the present invention there is provided a hose receiving member designed to be introduced into the end of the hose to be connected to some other conduit, while exterior to the hose a suitable number of wedge shaped clamp members are applied, and these wedge shaped clamp members are lodged in a conical sleeve of a size to receive the corresponding end of the hose and the inner holding member. The sleeve is enlarged at one end and is there internally threaded to receive a threaded thrust collar or nut applied to the interior threaded portion of the conical sleeve in a manner to bear upon the member first introduced into the hose, and to bring the conical sleeve and the conical segments lodged therein into such relation to the thrust member that these conical segments are forced tightly against the exterior of the hose to become in part embedded therein and to in turn cause the embedding of the hose into the inner member which is toothed or otherwise shaped to permit the embedding. By this means no matter if the hose be old and the rubber soft it is firmly held against any internal pressure or other force tending to separate it from the coupling.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings, but may be changed and modified so long as such changes and modifications mark no material departure from the salient features of the invention.

In the drawings:—Figure 1 is an elevation of the improved coupling showing a small section of rubber hose at one end and a pipe connection at the other. Fig. 2 is a longitudinal diametric section of the structure shown in Fig. 1. Fig. 3 is a section on the line 3—3 of Fig. 2. Fig. 4 is a perspective view of one of the conical clamp segments.

Referring to the drawings, there is shown a tubular member 1 having an internal bore 2 and at one end this tubular member is provided with a threaded neck 3 for receiving a pipe 4 which it is desired should be placed in communication with hose 5, such hose being what is ordinarily known as rubber hose and may be of the quality known as steam hose, since the invention is designed to be useful where comparatively high pressures are employed, and such quality of hose is customarily used for such purpose. The end of the tubular member 1 remote from the neck or nipple 3 is formed with an axially extended neck 6 having its interior forming a continuation of the bore 2 and on the exterior formed with a longitudinal series of circularly arranged teeth or ledges 7 directed toward the body of the tubular member. Where the tubular member is joined by the neck 6 it is laterally expanded and has its margins formed with a radially projecting flange 8. Adjacent the neck 3 the tubular member is of hexagonal or other suitable shape, as indicated at 9, for the application of a wrench or other tool.

Adapted to the exterior of the tubular member between the flange 8 and the hexagonal portion 9 is a nut 10 having one end polygonal, as indicated at 11, for the application of a suitable tool and the other end internally grooved, as indicated at 12, to receive the flange 8, while the exterior of the nut is screw threaded, as indicated at 13. There is also provided a sleeve 14 having an internally tapered wall 15 contracting the internal diameter of the sleeve toward the corresponding end until the smaller end 16 of the sleeve is of a size to snugly embrace the hose 5. The other end 17 of the sleeve is of greater external diameter than the nut 10 or tubular member 1 receiving the nut, and the end 17 of the sleeve is internally threaded, as indicated at 18, to receive the threaded portion 13 of the nut 10, this threaded portion being of greater diameter than the larger end of the taper wall 15 of the sleeve 14. Adapted to the taper portion of the sleeve 14 are taper clamp segments 19 each curved in conformity with the wall 15 and also tapering in conformity with this wall and the segments are usually though not necessarily three in number. These segments when their edges are in contact have an internal diameter less than the external diameter of the hose 5 and agree in curvature to the curvature of the tapering wall 15. These segments 19 have an outer tapering wall 20 and an inner substantially cylindrical wall 21 in which are produced numerous parallel circumferential grooves 22. The length of the segments 19 may be substantially that of the neck 6, while the length of the sleeve 14 is such as to house the segments and project beyond them when applied to the hose about the neck 6 so as to prevent the hose from bending where clamped, and thus prevent liability of the hose breaking.

When the parts are assembled the hose 5 is introduced through the small end 16 of the sleeve 14 and then the neck 6 is introduced into the hose until it abuts against the corresponding end of the tubular member 1. Now the segments 19 are introduced into the sleeve 14 about the hose, so that their thicker ends are adjacent the flange 8 and then by screwing the nut 10 into the internally threaded end 17 of the sleeve 14 the taper wall 15 is drawn along the outer taper wall 20 of the segments 19, but these segments cannot move along the hose because of the abutment of their thicker ends against the shoulder formed at the flanged end of the tubular member 1. The result of this is that the inner walls of the segments 19 are forced directly into the body of the hose in a direction perpendicular to the longitudinal axis thereof until the ridges formed between the adjacent grooves 22 sink into the body of the hose and the latter is also forced against the shoulders 7 and sink to the bases of these shoulders. The hose is thereby firmly clamped even though the rubber be quite soft, and this clamping is commensurate with the extent of screwing of the nut 10 into the sleeve extension 17. The result is that even under strong internal pressures the hose is firmly held, and, moreover, all tendency of leakage is avoided. The bore 2 may be approximately that of the hose 5, for hose will give to a certain extent, thus permitting the introduction of the neck 6 even though the external diameter thereof be somewhat in excess of the bore of the hose.

It will be observed that the clamping of the hose is accomplished without the movement of any parts engaging the hose longitudinal thereof and with all threaded portions maintaining their proper relation.

What is claimed is:—

A hose coupling comprising a tubular member formed at one end with a hose entering neck from which the tubular member is laterally expanded and formed into a radially projecting peripheral flange, an externally threaded nut interiorly adapted to the tubular member and provided at one end with a groove for receiving said flange, and of substantially the length of the flange axially, a sleeve having one end internally threaded and of a size to receive the nut, the other end of the sleeve being internally tapered, and a series of segmental exteriorly tapered members each having the inner wall shaped for engagement with the exterior of a portion of hose applied to the hose entering neck of the tubular member, said taper members each having the outer wall shaped for direct engagement with the inner taper wall of the sleeve and each of a size to permit abutment of its thicker end with the flange end of the tubular member and that portion of the sleeve surrounding the segmental taper members being of a length to house the taper members and extend beyond them and also beyond the neck receiving the hose and there of a diameter to closely approach the hose when applied to the coupling to prevent the hose from bending where clamped to the neck.

In testimony that I claim the foregoing as my own, I have hereto affixed my signature in the presence of two witnesses.

CLARENCE R. PATTY.

Witnesses:
M. W. TWAYNE,
MYRTLE SLAUGHTER.